United States Patent
Rahman et al.

(10) Patent No.: US 9,166,877 B2
(45) Date of Patent: *Oct. 20, 2015

(54) DISTINGUISHING BETWEEN CONNECTIVITY VERIFICATION AVAILABILITY AND FORWARDING PROTOCOL FUNCTIONALITY IN A COMPUTER NETWORK

(71) Applicant: Cisco Technology, Inc., San Jose, CA (US)

(72) Inventors: Reshad A. Rahman, Ottawa (CA); David P. Toscano, Ottawa (CA); Sylvain Masse, Boussens (CH); Jonathan Parker, Ottawa (CA); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/861,939

(22) Filed: Apr. 12, 2013

(65) Prior Publication Data

US 2013/0229909 A1    Sep. 5, 2013

Related U.S. Application Data

(63) Continuation of application No. 11/839,882, filed on Aug. 16, 2007, now Pat. No. 8,437,272.

(51) Int. Cl.
*G01R 31/08* (2006.01)
*H04L 12/24* (2006.01)
*H04L 29/06* (2006.01)

(52) U.S. Cl.
CPC ............ *H04L 41/0695* (2013.01); *H04L 69/16* (2013.01)

(58) Field of Classification Search
CPC ..................................................... H04W 24/00
See application file for complete search history.

(56) References Cited

U.S. PATENT DOCUMENTS 6,308,213 B1 * 10/2001 Valencia ........................ 709/229
6,754,622 B1    6/2004 Beser et al.

(Continued)

OTHER PUBLICATIONS

Katz, D., et al., "BFD for IPv4 and IPv6 (Single Hop) (draft-ietf-bfd-v4v6-1hop-03.txt)", Network Working Group Internet Draft, Mar. 2007, 8 pages.

(Continued)

*Primary Examiner* — Samina Choudhry
(74) *Attorney, Agent, or Firm* — Novak Druce Connolly Bove + Quigg LLP (57) ABSTRACT

In one embodiment, a local network device transmits a connectivity verification protocol control message over a link to a remote network device to attempt to establish a connectivity verification protocol session with the remote network device. In response to non-receipt of a returned connectivity verification protocol control message from the remote network device, the local network device determines that there is an inability to establish a connectivity verification protocol session with the remote network device. The local network device then sends a connectivity verification protocol echo message over the link to the remote network device without establishment of a connectivity verification protocol session. The echo message is sent using a forwarding protocol. In response to receipt of a reply to the connectivity verification protocol echo message from the remote network device, the local network device determines that the forwarding protocol is functioning and uses the link to forward data traffic to the remote network device.

19 Claims, 4 Drawing Sheets (56) References Cited

U.S. PATENT DOCUMENTS

| | | |
|---|---|---|
| 6,765,877 B1 | 7/2004 | Foschiano et al. |
| 6,820,120 B1* | 11/2004 | Keats et al. ............... 709/223 |
| 6,829,242 B2 | 12/2004 | Davison et al. |
| 6,834,139 B1 | 12/2004 | Prairie et al. |
| 7,016,313 B1 | 3/2006 | Harper |
| 7,046,928 B1 | 5/2006 | Bradford et al. |
| 7,139,242 B2 | 11/2006 | Bays |
| 7,146,419 B1 | 12/2006 | O'Rourke et al. |
| 7,164,761 B2 | 1/2007 | Brown et al. |
| 2003/0026273 A1* | 2/2003 | Davison et al. ............... 370/409 |
| 2003/0233595 A1 | 12/2003 | Charny et al. |
| 2005/0022189 A1* | 1/2005 | Proulx et al. ............... 718/100 |
| 2005/0147051 A1 | 7/2005 | Suri |
| 2006/0077891 A1 | 4/2006 | Smith et al. |
| 2006/0126495 A1 | 6/2006 | Guichard et al. |
| 2008/0240233 A1 | 10/2008 | Au et al. |
| 2009/0046723 A1 | 2/2009 | Rahman et al. |

OTHER PUBLICATIONS

Katz, D., et al., "Bidirectional Forwarding Detection (draft-ietf-bgd-base-06.txt)", Network Working Group Internet Draft, Mar. 2007, 45 pages.

Katz, D., et al., "Generic Application of BFD (draft-ietf-bfd-generic-03.txt)", Network Working Group Internet Draft, Mar. 2007, 15 pages.

* cited by examiner

DISTINGUISHING BETWEEN CONNECTIVITY VERIFICATION AVAILABILITY AND FORWARDING PROTOCOL FUNCTIONALITY IN A COMPUTER NETWORK

RELATED APPLICATIONS

The present application is a continuation of U.S. patent application Ser. No. 11/839,882 filed on Aug. 16, 2007 by Rahman et al., entitled "Distinguishing Between Connectivity Verification Availability and Forwarding Protocol Functionality in a Computer Network", the contents of which are incorporated herein by reference in their entirety.

TECHNICAL FIELD

The present disclosure relates generally to computer networks, and, more particularly, to connectivity verification and forwarding protocols between network devices in computer networks.

BACKGROUND

Because of the increasing need for faster network response time and convergence in computer networks, administrators often require the ability of individual network devices to quickly detect failures. Connectivity verification protocols, such as Bidirectional Forwarding Detection (BFD), may provide rapid failure detection times between devices, while maintaining low overhead. BFD verifies connectivity between two devices based on rapid transmission of BFD control packets between the two devices. Notably, BFD also provides a single, standardized method of link/device/protocol failure detection at any protocol layer and over any media. Generally, BFD sessions may be established between network devices or nodes (e.g., routers) in order to monitor connectivity of the nodes over a particular link between the nodes.

One problem with using connectivity verification protocols, such as BFD, is that it is difficult for a local network device to determine whether a detected failure due to a non-responsive remote network device is caused by a failure/unavailability of the connectivity verification protocol at the remote network device, or by a failure of the forwarding protocol/plane of the adjacency/link between the devices. A monitoring local network device has generally only been able to determine that it is unable to establish/maintain a connectivity verification protocol (BFD) session because it is not receiving control messages from the monitored remote network device. Declaring a link to a remote network device as functional (up) or failed (down) when it is not produces undesirable results in the network, such as improper traffic forwarding, etc., as will be understood by those skilled in the art.

For example, a routing protocol (e.g., BGP and IGP, etc.) of a local network device typically creates a BFD session with a remote network device once a routing adjacency is determined between those devices, e.g., after learning of the adjacency through routing exchange messages or after a failed link becomes functional again, etc. If the BFD session does not establish properly (e.g., if the remote network device does not respond to the local network device), the cause may be due to BFD not being configured (or yet operational) on the remote network device, or due to a forwarding protocol/plane failure, such as the Internet Protocol (IP) not functioning on the adjacency. Generally, because BFD does not know the reason for the inability to establish the session, no action is taken, and the routing adjacency remains in place (e.g., causing possible forwarding of traffic over the adjacency, which may or may not be functioning). There remains a need, therefore, for a technique that determines why a connectivity verification protocol (e.g., BFD) session is not functioning, e.g., such as due to a failure of the link/node, or just a problem with the connectivity verification protocol.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a local network device may determine an inability to establish a connectivity verification protocol (e.g., Bidirectional Forwarding Detection, "BFD") session to a remote network device, such as from unreturned control messages. In response, the local network device may send at least one connectivity verification protocol echo message (e.g., a BFD Echo message) to the remote network device, the echo message destined for (to be returned to) the local network device and forwarded using a forwarding protocol. In response to receiving or not receiving the echo message, the local network device may thus determine whether the forwarding protocol is functioning between the local and remote network devices. In this manner, the local network device may determine whether an inability to establish a connectivity verification protocol session is due to an inability to forward packets between the devices, or due to the connectivity verification protocol not working (or not being configured) on the remote network device.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols ("forwarding protocols"), such as the Transmission Control Protocol/Internet Protocol (TCP/IP). In this context, a protocol consists of a set of rules defining how the nodes interact with each other.

Figure 1:
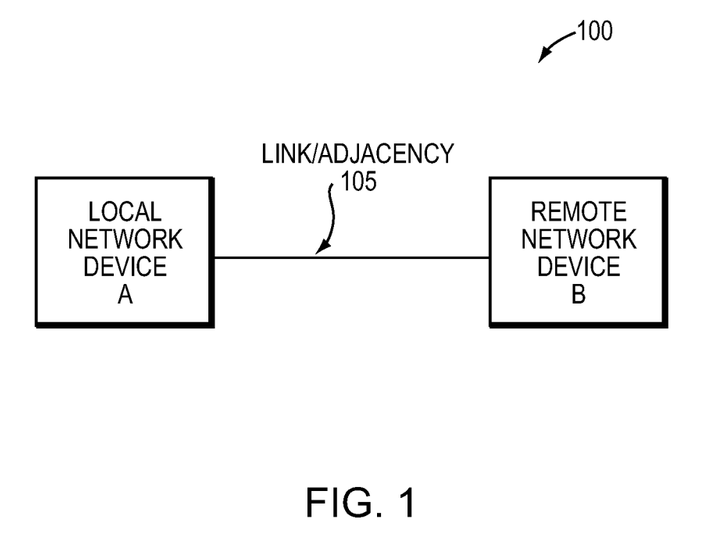
FIG. 1 illustrates an example computer network.

FIG. 1 is a schematic block diagram of an example computer network 100 illustratively comprising nodes/devices, such as a local network device A and a remote network device B, interconnected by a link/adjacency 105 as shown. Those skilled in the art will understand that any number of nodes, devices, links, etc. may be used in the computer network, and that the view shown herein is for simplicity. Those skilled in the art will also understand that while the embodiments disclosed herein are described generally, those embodiments may apply to any network configuration within an Autonomous System (AS) or area, or throughout multiple ASes or areas, etc. Also, data packets (e.g., traffic sent between the network devices) may be exchanged among the nodes/devices of the computer network 100 using predefined network communication protocols (forwarding protocols of a forwarding plane) in addition to TCP/IP, such as the User Datagram Protocol (UDP), Asynchronous Transfer Mode (ATM) protocol, Frame Relay protocol, Internet Packet Exchange (IPX) protocol, or other known forwarding protocols.

Figure 2:
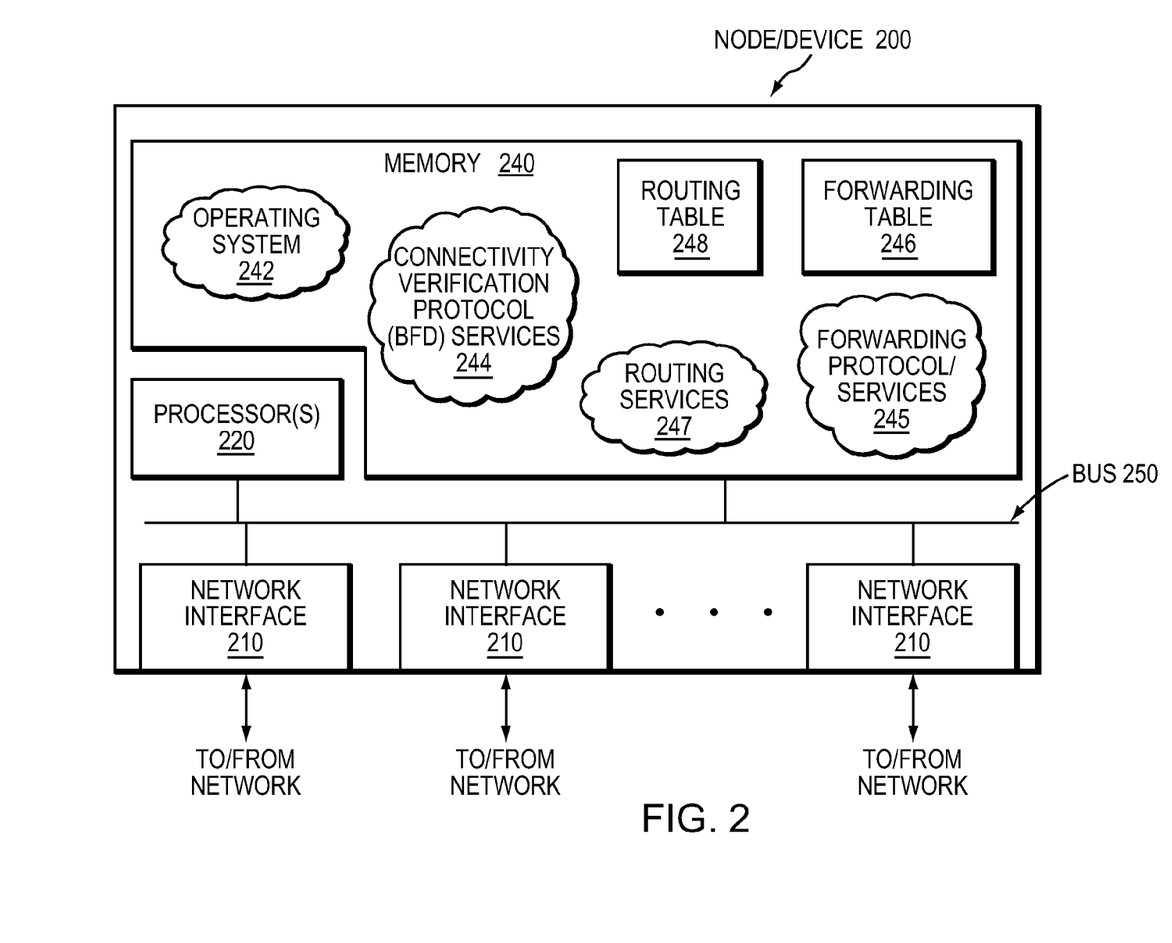
FIG. 2 illustrates an example network device/node.

FIG. 2 is a schematic block diagram of an example node/device 200 that may be advantageously used with one or more embodiments described herein, e.g., as local and/or remote network devices A and B. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication/forwarding protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a routing table 248. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 247, forwarding protocol/services 245, and connectivity verification protocol/services 244. It will be apparent to those skilled in the art that other processor and memory means, including various computer-readable media, may be used to store and execute program instructions pertaining to the inventive technique described herein.

Routing services 247 contain computer executable instructions executed by processor(s) 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), static routing, etc., as will be understood by those skilled in the art. These functions may be configured to manage routing table 248 containing, e.g., data used to make routing decisions for routing adjacencies between devices, as will be understood by those skilled in the art. In particular, changes in the network topology may be communicated among routers 200 using routing protocols, such as the conventional OSPF and IS-IS link-state protocols (e.g., to "converge" to an identical view of the network topology), or through static routing configurations. Notably, routing services 247 may also perform functions related to virtual routing protocols, such as maintaining VRF instances (not shown), or tunneling protocols, such as for Multi-Protocol Label Switching, etc., each as will also be understood by those skilled in the art.

Forwarding protocol/services 245 contain computer executable instructions executed by processor(s) 220 to perform functions provided by one or more forwarding protocols, such as TCP/IP, UDP, ATM, SONET, wireless protocols, Frame Relay, Ethernet, IPX, FDDI, etc. These functions may also be configured to manage forwarding information database (forwarding table 246) containing, e.g., data used to make forwarding decisions (e.g., as determined from the routing table 248, as will be understood by those skilled in the art) for forwarding adjacencies between devices, as will be understood by those skilled in the art.

Connectivity verification protocol services (or process 244) contain computer executable instructions executed by each processor 220 to verify connectivity between two systems/devices. Illustratively, a connectivity verification protocol that may be used is the Bidirectional Forwarding Detection (BFD), such that "BFD services 244" (i.e., in BFD configured/capable devices) may verify connectivity between two systems/devices, depending on the transmission of BFD control packets ("BFD messages") between the two devices. BFD is further described in the Internet Drafts by Katz, et al., entitled *Bidirectional Forwarding Detection <draft-ietf-bfd-base-06.txt>*, *Generic Application of BFD<draft-ietf-bfd-generic-03.txt>*, and *BFD for IPv4 and IPv6 (Single Hop)<draft-ietf-bfd-v4v6-1hop-06.txt>*, each dated March 2007. (Notably, as used herein, the terms/phrases "BFD" and "connectivity verification protocol" may be used interchangeably herein; however, BFD is merely one example of a connectivity verification protocol, and is not meant to be limiting on the scope of the present disclosure.)

Assume, for example, that device A (a monitoring node) wishes to verify its connectivity to device B (a monitored node) using BFD. Device A may transmit a BFD message to device B, and device A verifies connectivity based on a response/non-response from device B, e.g., within a particular time period. If device A does not receive a response from device B within the time period, device A determines that the BFD session has failed or "timed out" (or is "down"), accordingly. (Notably, a more detailed description of this process for distinguishing between connectivity verification availability and forwarding protocol functionality in accordance with the present description is provided below.)

Figure 3:
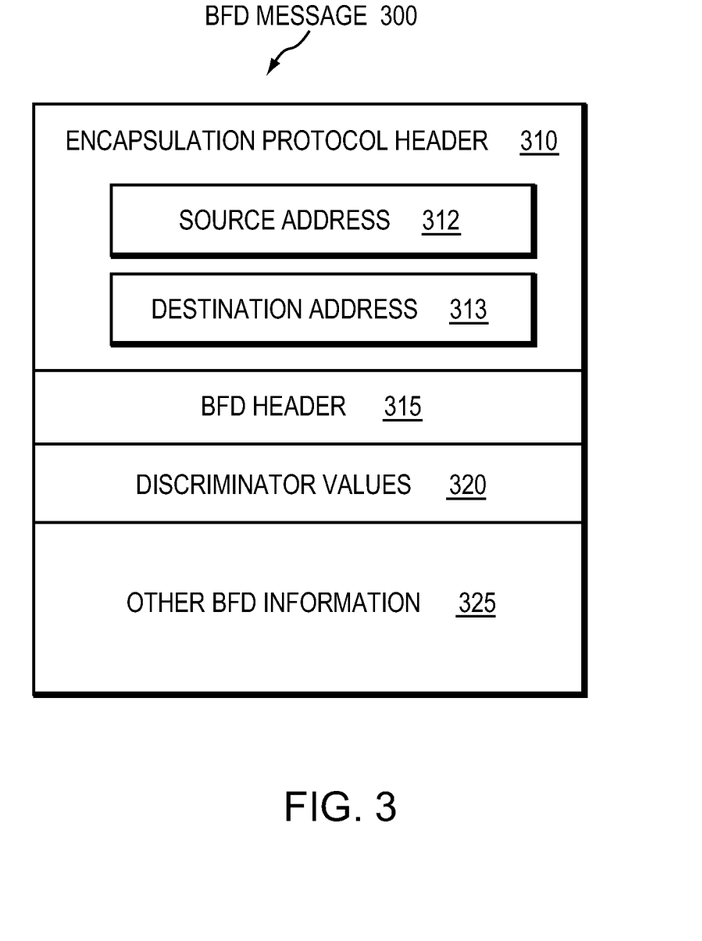
FIG. 3 illustrates an example connectivity verification protocol message.

FIG. 3 illustrates an exemplary connectivity verification protocol message ("BFD message") 300 that may be transmitted by BFD capable devices 200. Illustratively, the BFD message 300 is a generic BFD message, and those skilled in the art will understand that other BFD messages (e.g., Echo messages, described below) may comprise other fields accordingly. The message 300 includes an encapsulation protocol header 310, an optional BFD header field 315, a discriminator values (e.g., a "My Discriminator" and/or "Your Discriminator) field 320, and a field for other BFD information 325. As those skilled in the art will understand, BFD messages 300 are sent in an encapsulation appropriate to the environment (e.g., TCP/IP, MPLS, etc.). Thus, the encapsulation protocol header 310 contains information standard for the specific type of encapsulation. A source address 312 and destination address 313 within the header may be network addresses for the sending device and receiving device, respectively.

The BFD header field 315 may comprise standard BFD header information, such as, e.g., a BFD version number, a message length, certain flags, etc., or other information (more or less) as configured by the sending device. Because a sending device may have more than one BFD session established at a time (e.g., with the same receiving device, or other receiving devices), the discriminator fields 320 contain sufficient information to demultiplex the BFD messages 300 to the correct BFD session once it has been received by the receiving device. An example discriminator may be an opaque value that identifies each BFD session, and which is unique among all BFD sessions at each device. For instance, a "My Discriminator" value is unique at the sending device, while a "Your Discriminator" value is unique at the receiving device. Also, the other BFD information field 325 may be used according to the BFD protocol, such as, e.g., timer interval values, authentication, etc. Notably, BFD may operate across any number of links and at any protocol layer, e.g., Physical, Data Link, Network, Virtual, etc., as will be understood by those skilled in the art.

One configuration option for use with a BFD enabled device is a BFD Echo function. When the Echo function is active (i.e., an "Echo session"), BFD Echo messages, e.g., a single Echo packet or a stream of Echo packets, are transmitted from a first device (e.g., device A) in such a way as to have a second device (e.g., device B) "loop" the Echo message back to the first device. BFD Echo messages 300, in particular, have a source address 312 and destination address 313 that are both the network address for the sending device (e.g., device A). (Where applicable, a destination MAC address may be configured as the MAC address of the remote network device, as may be understood by those skilled in the art.) For example, the sending device A may send the Echo message 300 to its returning peer device (e.g., device B) with a destination address of itself, such that the returning device B simply forwards the Echo message back to the sending device A. (Note that the "Your Discriminator" value and other fields need not be used in an Echo message 300, as the payload is a local matter for the sending device A). This alleviates requirements for the second device to examine the contents of the Echo message, which also saves overall BFD processing time. In this way, Echo messages do not require BFD to be configured or operational on the second device (e.g., device B), since the message is simply forwarded based on the destination address 313 of the message (that is, using the forwarding protocol/plane). Conventionally, if the Echo message (or a number of Echo packets of the message) is not returned to the first device, the session is declared to be down by the first device. When a failure is detected (of the link or a remote node/device), interested applications, such as routing protocols, etc., may take appropriate action, e.g., they remove any reference to the adjacency from routing/forwarding tables, and route traffic around the point of failure.

As noted, one problem with using connectivity verification protocols, such as BFD, is that it is difficult for a local network device to determine whether a detected failure due to a non-responsive remote network device is caused by a failure/unavailability of the connectivity verification protocol at the remote network device, or by a failure of the forwarding protocol/plane of the adjacency/link between the devices. Generally, for routing protocols that operate on the same forwarding plane as BFD (e.g., BGP and OSPF, which operate over IP), the control messages for those protocols may detect the forwarding plane issues. Thus, it is unlikely that the cause of a BFD failure is that the forwarding protocol is "broken", otherwise the routing adjacency would not be up (unless, that is, the cause is a "selective" failure, such as certain types of traffic not functioning properly, as described below). As such, the response of BFD to do nothing is acceptable, as it is more than likely that the problem lies with BFD itself (and if not, the routing protocols may eventually detect the forwarding protocol problem/failure). For other routing protocols, such as the IS-IS protocol (whose routing exchange does not run on IP, but on the Connectionless Network Service, or "CLNS") and static routing, it is possible that BFD sessions are not available because of an IPv4 or generic forwarding issue. If so, any traffic forwarded over the adjacency would be "black-holed" (lost) since the IS-IS adjacency would remain up/maintained (assuming the adjacency is still connected and CLNS is operational), or since static routes generally have no connectivity exchange, thus would not detect the failure.

Distinguishing Between Connectivity Verification Availability and Forwarding Protocol Functionality According to embodiments of the disclosure, a local network device (e.g., device A) may determine an inability to establish a connectivity verification protocol (e.g., BFD) session to a remote network device (e.g., device B), such as from unreturned control messages 300. In response, the local network device may send at least one connectivity verification protocol echo message (e.g., a BFD Echo message) 300 to the remote network device, the echo message destined for (to be returned to) the local network device and forwarded using a forwarding protocol. In response to receiving or not receiving the echo message, the local network device may thus determine whether the forwarding protocol is functioning between the local and remote network devices. In this manner, the local network device may determine whether an inability to establish a connectivity verification protocol session is due to an inability to forward packets between the devices, or due to the connectivity verification protocol not working (or not being configured) on the remote network device.

In an illustrative embodiment, connectivity verification protocol (e.g., BFD) process/service 244 contains computer executable instructions executed by each processor 220 of the network device 200 to perform functions related to the novel techniques described herein, e.g., distinguish between connectivity verification availability and forwarding protocol functionality. Notably, the features/techniques described herein may be enabled or disabled under certain circumstances, such as through manual configuration by a system administrator. Also, according to one or more embodiments, one of either the local or remote network devices (A and B) may not be configured to operate a connectivity verification protocol. In the embodiments (described below) where the local network device is not so configured, various features and/or functions of the embodiments described herein may be performed by other services (e.g., routing services 247, forwarding protocol/services 245, etc.), and the assignment of some or all of the features/functions to the connectivity verification protocol process/service 244 is merely a representative example. Also, as noted above, the terms/phrases "connectivity verification protocol" and "BFD" may be used interchangeably herein.

Operationally, the local network device A may determine an inability to establish a connectivity verification protocol (BFD) session to a remote network device B. For instance, as mentioned above, the local network device may attempt to establish the session in response to receiving routing information indicating a connection between the local and remote network devices (e.g., learning of a routing adjacency). Accordingly, to attempt to establish the session, the local network device may transmit/send BFD control messages 300 to the remote network device, soliciting a response. If after a configurable length of time, no BFD control messages 300 are returned from the remote network device, the local network device may thus determine the inability to establish the session. (Notably, in response to receiving a returned BFD control message 300 from the remote network device, the local network device may determine that the forwarding protocol is functioning between the local and remote network devices, accordingly.)

Alternatively (or in addition), the local network device may also determine an inability to establish the session after having previously maintained an established session with control messages, and then determining that control messages are no longer being received. For instance, a BFD session may fail and will not reestablish, or the adjacency on which the BFD session is established fails, BFD is unconfigured on the remote network device, the adjacency is repaired, and then the BFD session will not reestablish, etc. Further, an inability to establish a BFD session may be determined as easily as determining that BFD is not configured on at least one of the local network device and the remote network device. For example, certain routing protocols (e.g., IS-IS) may have protocol extensions to indicate whether BFD is enabled. Also, manual configurations may be entered to indicate whether BFD is enabled on the local or remote devices, as well.

In response to determining the inability to establish a BFD session, the local network device A may send/transmit one or more BFD echo messages 300 to the remote network device and destined for the local network device (as mentioned above). In particular, the echo message 300 is forwarded using a forwarding protocol, e.g., which is to be used by traffic forwarded from the local network device to the remote network device, such as IP. Note that while conventional BFD echo messages 300 are sent only where a BFD session is established between the two devices, one or more embodiments described herein make use of echo messages even without an established control session. In this manner, as described herein, the echo messages may assist in determining whether the inability to establish the control session is due to the connectivity verification protocol (BFD) control session itself, or because of actual forwarding protocol/plane errors.

If an echo message 300 (e.g., a configurable number of echo messages) is received at the local network device A as returned from the remote network device B, then the local network device may determine that the forwarding protocol/plane is functioning between the local and remote network devices. In other words, the local network device may determine that traffic (data/packets) are reaching the remote network device over the forwarding adjacency, and that the inability to establish the BFD session is that BFD is not operational/configured at the remote network device. The local network device may thus determine whether the forwarding protocol is functioning between the local and remote network devices prior to configuring the forwarding of packets from the local network device to the remote network device (e.g., in forwarding table 246).

Conversely, in response to not receiving an echo message 300 (e.g., a configurable number of echo messages, for example, three), the local network device A may determine that the forwarding protocol/plane is not functioning between the local and remote network devices. Accordingly, the local network device may remove any routing (or forwarding) adjacency between the local and remote network devices, such as from routing table 248 (and forwarding table 246). In other words, the local network device may determine that traffic (data/packets) are not reaching the remote network device, and that it should tear down any adjacencies and attempt to reroute any traffic from going toward the remote network device. Notably, the local network device may still not know whether BFD is configured on the remote network device (it is most likely not at this particular point), but since the echo messages 300 are not returned, it may be concluded that traffic is not reaching the remote device. Moreover, as may be appreciated by those skilled in the art, failure to forward the echo messages 300 may be indicative of a failure of the forwarding protocol/plane (e.g., of IP), or of a physical issue (e.g., link failure/disconnect) which thus creates a forwarding failure, accordingly.

In the event the local network device receives a BFD control message 300 after determining that the forwarding protocol is not functioning between the local and remote network devices, but the local network device is still not receiving echo messages, the local network device may still determine that the forwarding protocol is not functioning. For instance, even though the control messages are being received (e.g., if BFD or other connectivity verification protocol control messages 300 are not transmitted on the forwarding plane), other problems may still be preventing the forwarding of the echo messages and other traffic. Also, if a BFD session is established (in progress), and a graceful session shutdown is received from the remote network device at the local network device, according to one or more embodiments, the local network device may shut down the BFD session, but may continue to send echo messages 300 (i.e., to continue to monitor the connectivity between the devices).

Further, where BFD is not configured on the local network device A, routing adjacencies may remain up even where the forwarding protocol/plane is broken/non-functioning. As such, as mentioned above, routing services 247 and/or forwarding protocol/services 245 may be configured to process BFD echo messages before installing a forwarding entry into forwarding table 246.

Figure 4:
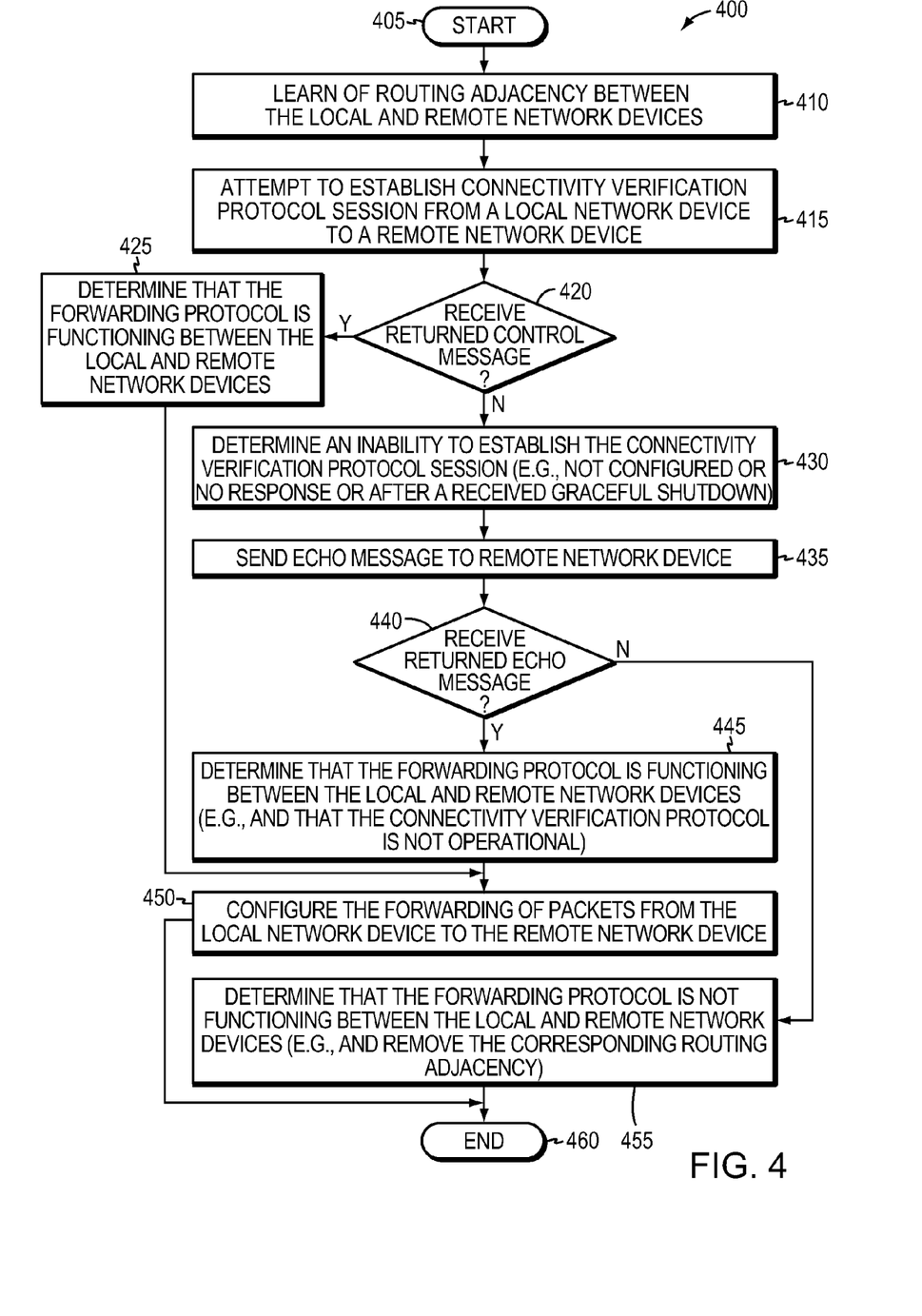
FIG. 4 illustrates an example procedure for distinguishing between connectivity verification availability and forwarding protocol functionality.

FIG. 4 illustrates an example procedure for distinguishing between connectivity verification availability and forwarding protocol functionality in accordance with one or more embodiments described herein. The procedure 400 starts at step 405, and continues to step 410, where the local network device (e.g., routing services 247 of device A) may learn of a routing adjacency with the remote network device (e.g., device B), such as through IGP (e.g., IS-IS), static routing, etc. In response (in one or more embodiments) in step 415, the local network device may attempt to establish a connectivity verification protocol (e.g., BFD) session to a remote network device (e.g., using connectivity verification protocol process 244), such as by sending a control message 300 to the remote network device (i.e., addressed to the remote device). Upon receiving a returned control message 300 in step 420, the local network device A may determine in step 425 that the forwarding protocol (plane) is functioning between the local and remote network devices. If, however, the local network device does not receive a returned control message in step 420, then the local network device may determine an inability to establish the connectivity verification protocol session in step 430. For instance, as mentioned above, if after a certain configurable time and/or after a certain number of unreturned control messages, the local network device A may determine that a connectivity verification protocol session may not be established with remote network device B. Also, in accordance with embodiments of the disclosure, steps 415-425 may be bypassed to reach step 430, such that if the local network device is already aware that there is an inability to establish the session (e.g., where either network device is not configured for the session, etc.).

Once it is determined that a connectivity verification protocol session is unavailable in step 430, the local network device A may send an echo message 300 (e.g., a BFD Echo message) to the remote network device B in step 435, i.e., addressed to the local network device, as described above. If an echo message is returned in step 440, then the local network device may determine in step 445 that the forwarding protocol (i.e., the forwarding plane) is functioning between the local and remote network devices. Note that if the local network device has not received a returned control message (step 420), yet does receive a returned echo message (step 440), then the local network device may also determine that the connectivity verification protocol is not operational at the remote network device, accordingly. In response to determining that the forwarding protocol/plane is functioning (or, notably, in response to determining that the connectivity verification protocol is functioning in step 425), the local network device may configure the forwarding of packets from the local network device to the remote network device appropriately in step 450, such as in forwarding entries of forwarding table 249.

If, on the other hand, the local network device A does not receive a returned echo message 300 in step 440, then the local network device may determine that the forwarding protocol/plane is not functioning between the local and remote network devices in step 455. As such, the local network device may remove the corresponding routing adjacency (e.g., from routing table 248), as mentioned above. The procedure 400 ends in step 460, with having determined either a functioning or non-functioning forwarding protocol/plane between the local and remote network devices. Notably, in the event of a graceful shutdown from the remote network device, as mentioned above, the procedure 400 may return to step 430 to determine that the session is unavailable, and may continue to send echo messages, accordingly. Also, if after step 445 and/or 455 the local network device receives a control message 300 from the remote network device (i.e., after having not received a control message in step 420), the procedure 400 may return to step 420 if receiving echo messages in step 445, or may continue to determine that the forwarding protocol/plane is not functioning if still not receiving echo messages in step 455 (paths not shown for clarity).

Advantageously, the novel techniques described herein distinguish between connectivity verification availability and forwarding protocol functionality in a computer network. By sending echo messages in response to an inability to establish a connectivity verification protocol session (e.g., BFD session), the novel techniques provide a manner in which the local network device may distinguish between a connectivity verification (BFD) failure, or a forwarding protocol/adjacency failure, accordingly. In particular, forwarding functionality is confirmed prior to installing forwarding entries, specifically where connectivity verification may not be configured. In addition, the techniques described above make use of echo messages even where connectivity verification sessions are not established/configured. Also, the dynamic aspects of one or more embodiments described herein alleviate the need for cumbersome and inefficient manual configuration.

While there have been shown and described illustrative embodiments that distinguish between connectivity verification availability and forwarding protocol functionality in a computer network, it is to be understood that various other adaptations and modifications may be made within the spirit and scope of the present invention. For example, the embodiments have been shown and described herein with reference to IS-IS and/or static routing adjacencies. However, the embodiments of the invention in their broader sense are not so limited, and may, in fact, be used with other routing adjacencies and protocols, such as protocols operating over IP (e.g., Open Shortest Path First, or "OSPF", etc.). For instance, such protocols may eventually detect a forwarding adjacency failure, but other particularly specific failures, such as only one of either multicast or unicast transmissions failing over IP, may benefit from the techniques described above. Also, while in one or more illustrative examples given above a representative connectivity verification protocol is BFD, other connectivity verification protocols may be used in accordance with the disclosure (e.g., having sessions, control messages, and echo messages), as may be appreciated by those skilled in the art.

Further, while the above description describes a single link/hop between the local and remote network devices, according to one or more embodiments, the "link" or forwarding adjacency may comprise a multi-hop forwarding adjacency tunnel between the local and remote network devices. For example, according to Multi-Protocol Label Switching (MPLS), a plurality of links and hops may appear to forwarding protocols as a single hop (a single "forwarding adjacency"), as may be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
transmitting a connectivity verification protocol control message from a local network device over a link to a remote network device to attempt to establish a connectivity verification protocol session with the remote network device;
in response to non-receipt of a returned connectivity verification protocol control message from the remote network device, determining that there is an inability to establish a connectivity verification protocol session with the remote network device and sending a connectivity verification protocol echo message from the local network device over the link to the remote network device without establishment of a connectivity verification protocol session, the echo message sent using a forwarding protocol;
in response to receipt of a reply to the connectivity verification protocol echo message from the remote network device, determining the forwarding protocol is functioning and the inability to establish the connectivity protocol session is due to a failure with the connectivity verification protocol at the remote device; and using the link to forward data traffic from the local network device to the remote network device.

2. The method of claim 1, further comprising:

in response to receipt of the reply to the connectivity verification protocol echo message, also determining the connectivity verification protocol is not configured at the remote network device.

3. The method of claim 1, further comprising:

in response to non-receipt of the reply to the connectivity verification protocol echo message, determining the forwarding protocol is not functioning.

4. The method of claim 1, further comprising:

in response to determining the forwarding protocol is not functioning, removing a routing adjacency between the local network device and the remote network device.

5. The method of claim 1, further comprising:

receiving routing information at the local network device indicating a connection between the local network device and the remote network device, wherein the transmitting is performed in response to the receiving routing information.

6. The method of claim 1, further comprising:

learning of a routing adjacency between the local network device and the remote network device, wherein the transmitting is performed in response to the receiving routing information.

7. The method of claim 1, wherein the connectivity verification protocol control message is a Bidirectional Forwarding Detection (BFD) control message, the connectivity verification protocol session is a BFD session, and the connectivity verification protocol echo message is a BFD echo message.

8. The method of claim 1, wherein the forwarding protocol is Internet Protocol (IP).

9. The method of claim 1, wherein the sending is performed after a particular time has elapsed since non-receipt of the returned connectivity verification protocol control message.

10. The method of claim 1, wherein the transmitting transmits a plurality of connectivity verification protocol control messages, and wherein the sending is performed in response to non-receipt of a particular number of returned connectivity verification protocol control messages.

11. An apparatus comprising:

a network interface configured to communicate with a remote network device;

a processor coupled to the network interface and configured to execute one or more processes; and a memory configured to store a connectivity verification protocol process executable by the processor, the connectivity verification protocol process when executed operable to:

transmit a connectivity verification protocol control message over the network interface to the remote network device to attempt to establish a connectivity verification protocol session with the remote network device, in response to non-receipt of a returned connectivity verification protocol control message from the remote network device, send a connectivity verification protocol echo message over the network interface to the remote network device without establishment of a connectivity verification protocol session, the echo message sent using a forwarding protocol, in response to receipt of a reply to the connectivity verification protocol echo message, determine the forwarding protocol is functioning and a failure has occurred with the connectivity verification protocol at the remote network device, and permit data traffic to be forwarded to the remote network device.

12. The apparatus of claim 11, wherein the connectivity verification protocol process when executed is further operable to:

in response to receipt of the reply to the connectivity verification protocol echo message, also determine the connectivity verification protocol is not functioning at the remote network device.

13. The apparatus of claim 11, wherein the connectivity verification protocol process when executed is further operable to:

in response to determining the forwarding protocol is not functioning, cause a routing adjacency between the apparatus and the remote network device to be removed.

14. The apparatus of claim 11, wherein the connectivity verification protocol process when executed is further operable to:

transmit the connectivity verification protocol control message in response to received routing information that indicates the apparatus is connected to the remote network device.

15. The apparatus of claim 11, wherein the connectivity verification protocol process when executed is further operable to:

transmit the connectivity verification protocol control message in response to existence of a routing adjacency between the apparatus and the remote network device.

16. The apparatus of claim 11, wherein the connectivity verification protocol is Bidirectional Forwarding Detection (BFD), the connectivity verification protocol control message is a BFD control message, the connectivity verification protocol session is a BFD session, and the connectivity verification protocol echo message is a BFD echo message.

17. The apparatus of claim 11, wherein the forwarding protocol is Internet Protocol (IP).

18. A non-transitory computer-readable medium having software encoded thereon, the software when executed operable to:

in response to a failed attempt to form a connectivity verification protocol session between a local network device and a remote network device, send a connectivity verification protocol echo message to the remote network device without establishment of a connectivity verification protocol session, the echo message sent using a forwarding protocol;

in response to receipt of a response to the connectivity verification protocol echo message, determine the forwarding protocol is functioning and the failed attempt to form the connectivity verification protocol session is due to a failure with the connectivity verification protocol at the remote network device; and permit data traffic to be forwarded to the remote network device.

19. The non-transitory computer-readable medium of claim 18, wherein the connectivity verification protocol session is a Bidirectional Forwarding Detection (BFD) session, the connectivity verification protocol echo message is a BFD echo message and the forwarding protocol is Internet Protocol (IP).

\* \* \* \* \*